United States Patent [19]

Regnault et al.

[11] Patent Number: 5,052,223

[45] Date of Patent: Oct. 1, 1991

[54] APPARATUS INCLUDING A CAPACITIVE PROBE FOR MEASURING THE LEVEL AND/OR THE VOLUME OF A LIQUID

[75] Inventors: Serge Regnault, Paris; Francis Dunon-Bluteau, Chevilly-La Rue, both of France

[73] Assignee: Jaeger, Levallois-Perret, France

[21] Appl. No.: 530,264

[22] Filed: May 30, 1990

[30] Foreign Application Priority Data

May 31, 1989 [FR] France .................. 89 07164

[51] Int. Cl.⁵ .................. G01F 23/26
[52] U.S. Cl. .................. 73/304 C; 324/688; 73/292; 361/284
[58] Field of Search .............. 73/304 C, 292; 361/28 H; 340/620; 324/688, 690

[56] References Cited

U.S. PATENT DOCUMENTS

| | | | |
|---|---|---|---|
| 2,849,882 | 9/1958 | Lee | 73/304 C |
| 3,119,266 | 1/1964 | Atkinson | 324/688 |
| 3,706,980 | 12/1972 | Maltby | 324/688 |
| 3,781,672 | 12/1973 | Maltby et al. | 73/304 C |
| 3,918,306 | 11/1975 | Maltby | 73/304 C |
| 4,064,753 | 12/1977 | Sun et al. | 73/304 C |
| 4,166,388 | 9/1979 | Sun et al. | 73/304 R |
| 4,259,865 | 4/1981 | Myers | 73/304 C |
| 4,373,390 | 2/1983 | Van Dyke et al. | 73/304 C |
| 4,568,874 | 2/1986 | Kramer et al. | 324/688 |
| 4,589,077 | 5/1986 | Pope | 73/304 C |
| 4,918,376 | 4/1990 | Poduje et al. | 324/690 |

FOREIGN PATENT DOCUMENTS

| | | | |
|---|---|---|---|
| 2550337 | 2/1985 | France. | |
| 0459680 | 3/1975 | U.S.S.R. | 73/304 C |
| 84/03355 | 8/1984 | World Int. Prop. O. . | |

Primary Examiner—William A. Cuchlinski, Jr.
Assistant Examiner—Diego F. F. Gutierrez
Attorney, Agent, or Firm—Blakely, Sokoloff, Taylor & Zafman

[57] ABSTRACT

The present invention relates to apparatus for measuring the level and/or the volume of liquid contained in the tank. The apparatus being of the type comprising a capacitive probe including at least two generally vertical parallel separate main plates for immersing in the liquid, and capacitance-measuring means having a detection input and a ground, the detection input being connected to a first one of the main plates and the ground being connected to the second main plate, wherein the first plate is surrounded by a guard ring. Furthermore, the present invention measures the level or volume of a liquid by calculating a coefficient K using the expression $K = (Cmes - Cair)/(Cimm - Cair)$; in which Cmes is the measuring capacitance between the first and second plates; Cair is the capacitance of the first plate and the second plate in air; Cimm is the capacitance of the first plate and the second plate when they are totally immersed; and K is defined as the area of the first plate in the liquid divided by the total area of the first plate.

44 Claims, 8 Drawing Sheets

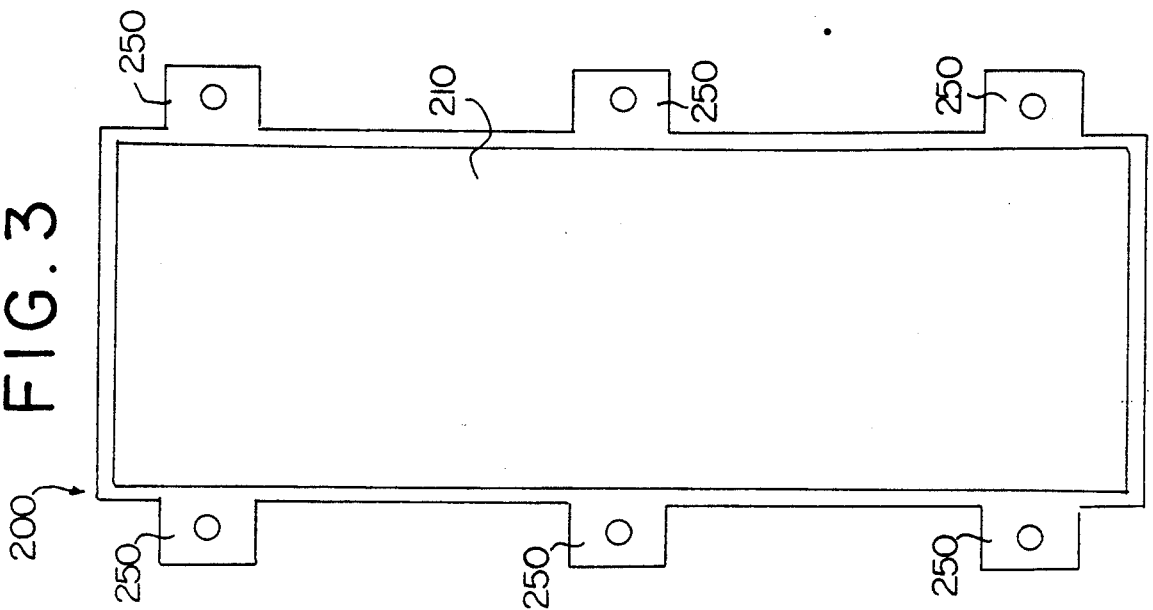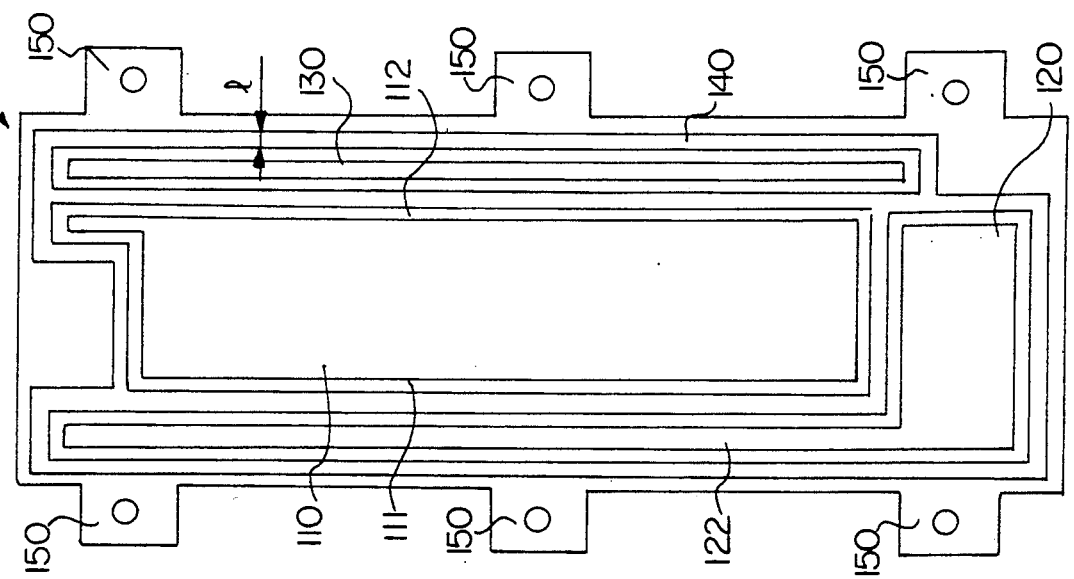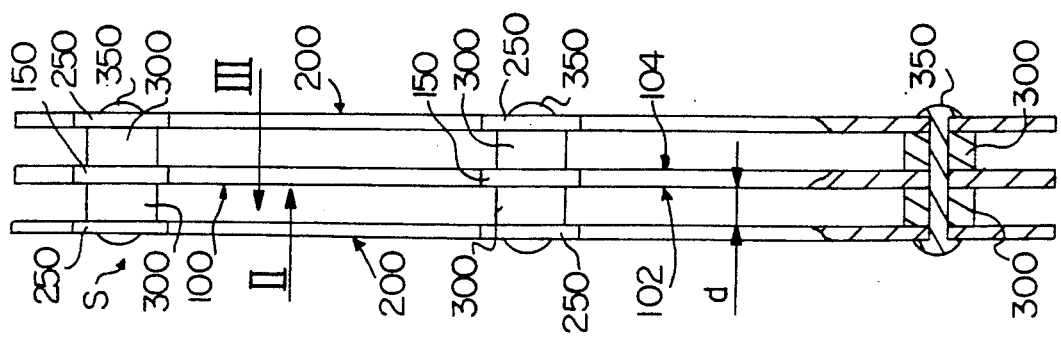

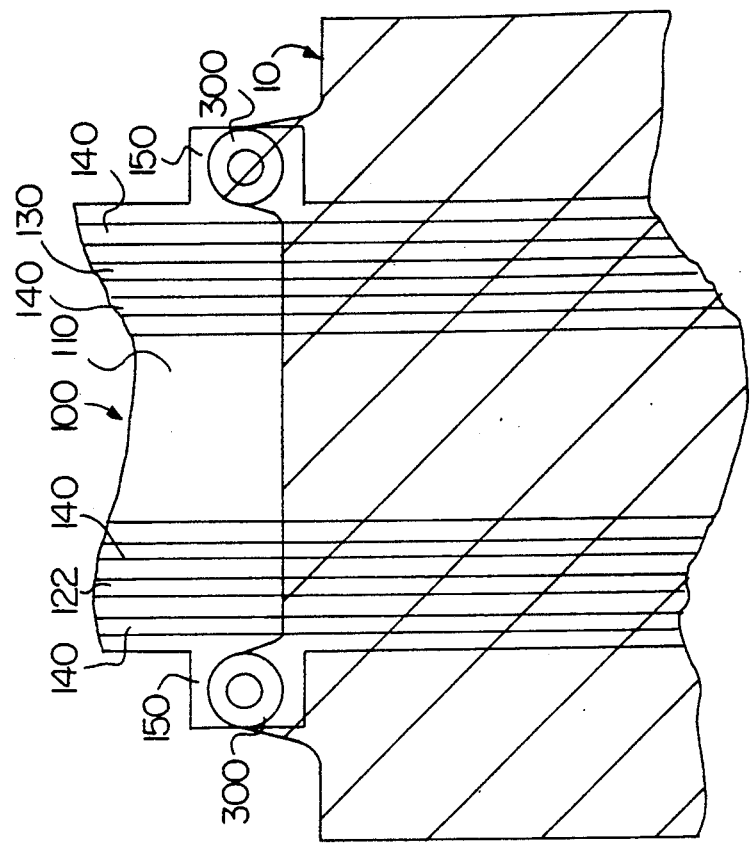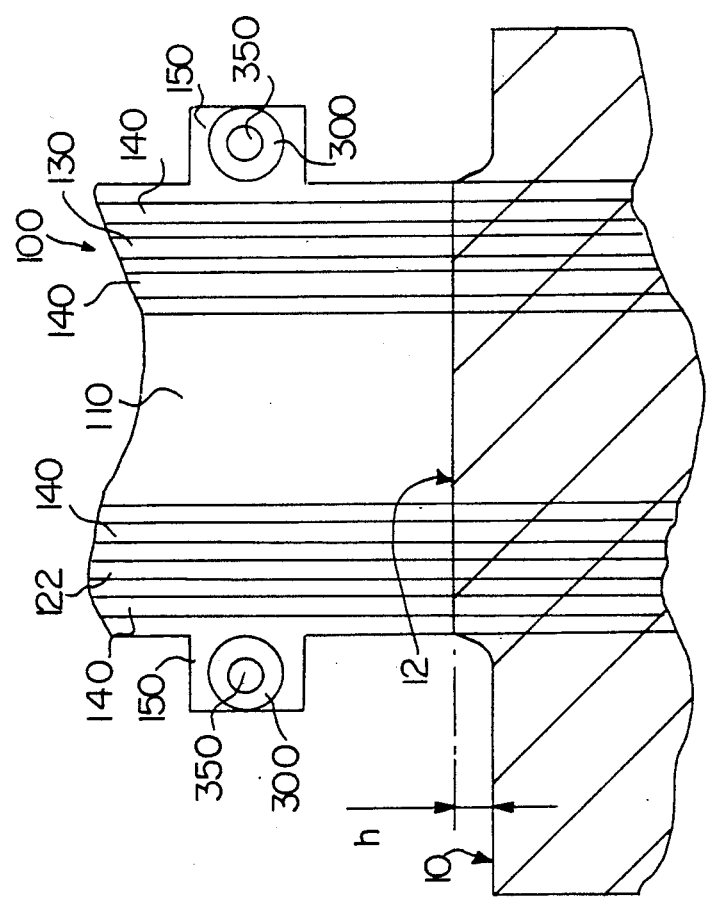

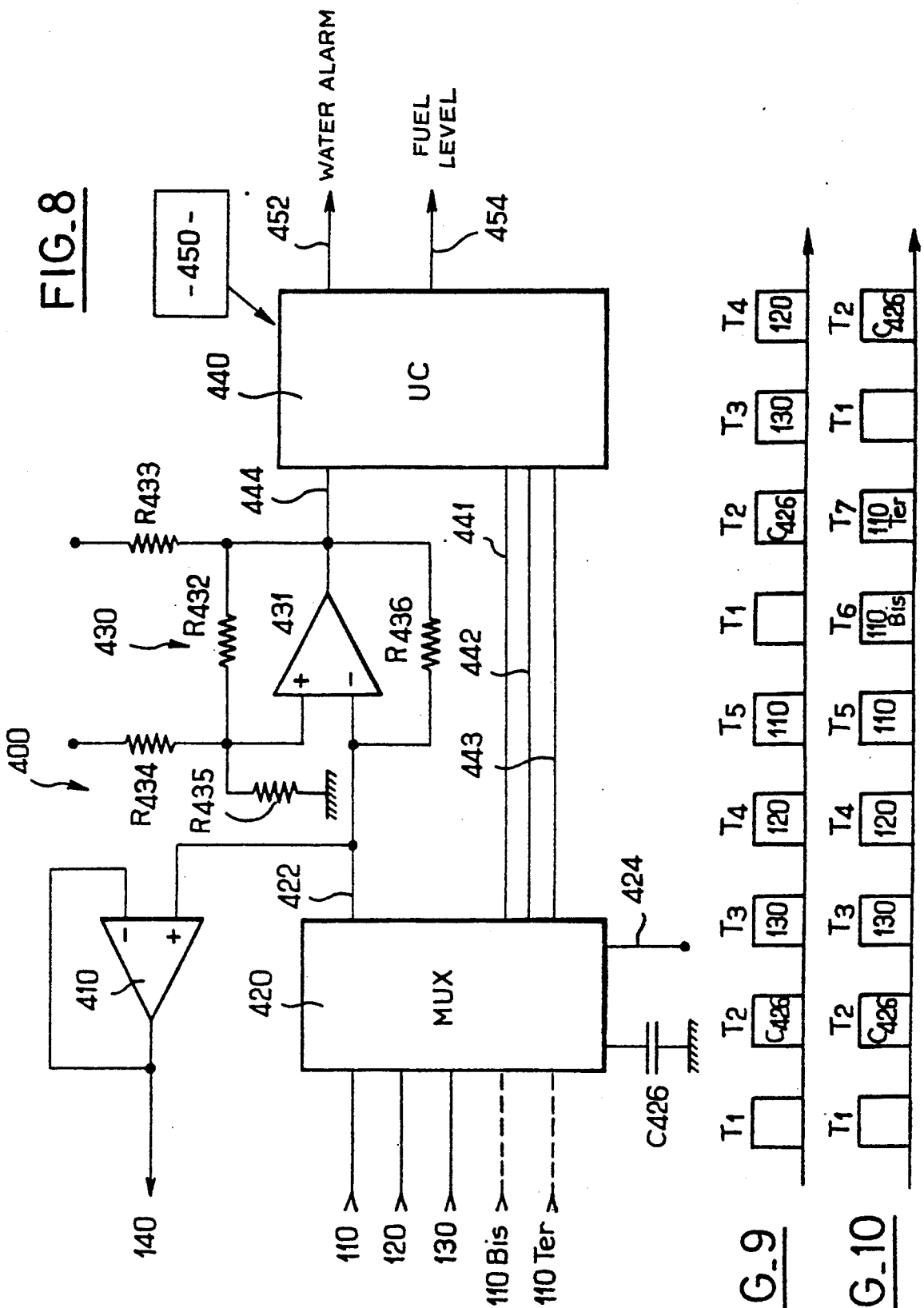
FIG_8
FIG_9
FIG_10

APPARATUS INCLUDING A CAPACITIVE PROBE FOR MEASURING THE LEVEL AND/OR THE VOLUME OF A LIQUID

The present invention relates to apparatus for measuring the level and/or the volume of a liquid in a tank. The present invention is particularly, but not exclusively, applicable to measuring the level or volume of fuel contained in the tank of a motor vehicle.

More precisely, the present invention relates to a conventional type of measurement apparatus for measuring the level and/or the volume of a liquid contained in a tank, the apparatus being of the type comprising a capacitive probe including at least two separate, generally vertical, parallel main plates for immersion in the liquid, and capacitance-measuring means having a detection input and a ground, the detection input being connected to a first one of the main plates and the ground being connected to a second one of the main plates.

BACKGROUND OF THE INVENTION

Various capacitive probe measurement apparatuses have already been proposed, for example in the following documents: FR-A-2 234 555, FR-A-2 402 193, FR-A-2 451 024, FR-A-2 500 169, and FR-A-2 500 337.

Compared with conventional systems having a float and a resistive strip, capacitive probe measurement apparatuses have the particular advantage of having no moving parts. However, in spite of this manifest advantage, capacitive measurement apparatuses are little used at present because they do not give full satisfaction, in particular with respect to accuracy.

The main object of the present invention is to provide a novel capacitive probe measurement apparatus having improved accuracy over prior systems.

An auxiliary object of the present invention is to provide a capacitive probe measurement apparatus compatible with all types of fuel, in particular with oxygen-containing fuels having a high content of methanol or of ethanol.

Another auxiliary object of the present invention is to provide capacitive probe measurement apparatus having high sensitivity, i.e. providing a large change in capacitance over the full range of measurement.

SUMMARY OF THE INVENTION

According to the present invention, the first above-mentioned plate of the probe is surrounded by a guard ring which is placed at the same potential as the said first plate by means of a potential copying stage interposed between the guard ring and the said first plate.

The guard ring serves to eliminate so-called "edge" effects, thereby improving measurement accuracy.

Advantageously, the capacitive probe comprises at least one support of electrically insulating material carrying a first main plate, an auxiliary plate located at the bottom of the support beneath the main plate to serve as a reference capacitance enabling the permittivity of the liquid to be determined, a connection track connected to the auxiliary plate and extending to the top of the support, a secondary plate element having the same shape as the connection track and extending parallel thereto, and the guard ring which surrounds the main plate, which surrounds the auxiliary plate and its associated connection track, and which surrounds the secondary plate element, the second plate being supported parallel to the support by spacers of electrically insulting material and extending over the main plate, the auxiliary plate, its connection track, and the secondary plate, the apparatus further including means designed to subtract the value of the capacitance determined by the secondary plate elements from the value of the capacitance determined by the auxiliary plate elements and the associated connection track.

Advantageously, the capacitance-measuring means comprises an oscillator loaded by the capacitive probe, means sensitive to the frequency of the oscillator, and means designed to load the oscillator during an initial calibration stage successively with capacitors having a known difference in capacitance.

Advantageously, the bottom of the capacitive probe has auxiliary plate elements which define a reference capacitance enabling the permittivity of the fluid to be determined, and means are provided which are designed to compare the measured permittivity of the fluid with a threshold, to generate an alarm if the measured permittivity exceeds the threshold, and to measure the level and/or the volume on the basis of a predefined permittivity value if the measured permittivity exceeds the threshold.

These dispositions serve to detect the presence of water in the bottom of the tank while still providing information of optimum accuracy.

In a first variant, the predetermined permittivity value is stored in suitable means at the system design stage.

In a second variant, the predetermined permittivity value corresponds to the last measured value of the permittivity prior to detecting that it has exceeded the threshold.

BRIEF DESCRIPTION OF THE DRAWINGS

Embodiments of the invention are described by way of example with reference to the accompanying drawings, in which:

FIG. 1 is a diagrammatic side view of a capacitive probe in accordance with the present invention;

FIGS. 2 and 3 are two diagrammatic face views of two of the electrodes constituting said probe, shown as seen looking along arrows II and III respectively of FIG. 1;

FIG. 6 is a diagram showing the phenomenon of liquid capillarity on one of the electrodes;

FIG. 7 shows the same phenomenon level with spacers provided between the electrodes; FIG. 8 is a circuit diagram of capacitance-measuring means in accordance with the present invention;

FIGS. 9 and 10 are timing diagrams for illustrating the operation of the measurement means in accordance with the present invention.

DETAILED DESCRIPTION

Figure 4:
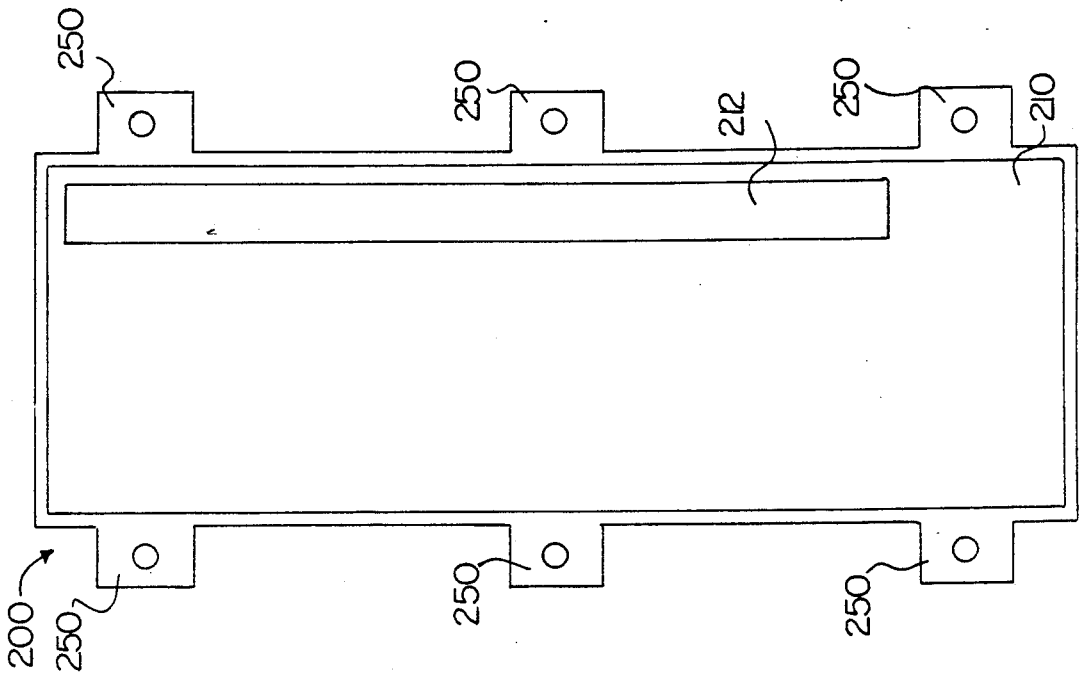
FIGS. 4 and 5 are views similar to FIGS. 2 and 3 respectively, showing another embodiment of electrodes in accordance with the present invention.

Accompanying FIGS. 1 to 3 show a capacitive probe S in accordance with a preferred embodiment of the present invention.

Probe S comprises a central plane electrode 100 disposed between two plane outer electrodes 200. The outer electrodes 200 are spaced apart from the central electrode 100 by spacers 300. The central electrode 100, the outer electrodes 200, and the spacers 300 are held together by tubular rivets 350 passing through the spacers 300. The rivets 350 are advantageously made of brass or aluminum. The electrodes 100 and 200 are parallel.

The central electrode 100 comprises a plane support body made of electrically insulating laminated material which is metal-coated on both faces. The laminated material is advantageously made either on the basis of polyimide or else on the basis of epoxy resin-impregnated glass fiber cloth. The support body 100 carries plates as shown in FIG. 2 on each of its two main faces 102 and 104.

These plates are advantageously made of copper by a subtractive method.

Laminates based on polyimide or on epoxy resin impregnated glass fiber are stable both dimensionally and geometrically (they do not warp or bend), and copper adheres to them excellently, even when immersed in any fuel.

A subtractive method is used to form on each of the faces 102 and 104 of the electrode 100: a main plate 110; an auxiliary plate 120 associated with a connection track 122; a secondary plate 130; and a guard ring 140.

Electrical connections between the plates 110, 120, 130, and 140 and the measurement means shown in FIG. 8 are provided at the top of the electrode 100.

The outer electrodes 200 may be made in the form of respective support bodies made of electrically insulating laminated material based on polyimide or glass fibers impregnated with epoxy resin, being metal coated on one face to define respective second main plates 210, as shown in FIG. 3. Each plate 210 should overlie the corresponding first main plate 110, auxiliary plate 120, connection track 122, secondary plate 130, and guard ring 140. Alternatively, the electrodes 200 could be constituted merely by respective sheets of tin plate or stainless steel.

The two outer electrodes 200 are advantageously identical in structure. The probe thus has a plane of symmetry corresponding to the midplane of the central electrode 100. This symmetry makes it possible, for substantially identical probe size, to double the capacitance of the probe by electrically interconnecting the plates 110, 122, 130, and 140 formed on each of the two main faces of the central electrode 100 in respective pairs, and also interconnecting the two outer electrodes 200.

The first main plate 110 and the second plate 210 constitute the measurement capacitance per se. To do this, the first plate 110 is essentially constituted by a vertically elongate metal-coated area. The auxiliary plate 120 is constituted by a metal-coated area provided at the bottom of the central electrode 100. The auxiliary plate 120 is electrically separate from the main plate 110. The auxiliary plate 120 and the facing plate 210 constitute a reference capacitance located at the bottom of the tank and consequently permanently immersed in liquid, and since the area of the auxiliary plate 120 is known, it serves as a reference capacitance for determining the exact permittivity of the liquid in question.

As shown in FIG. 2, the auxiliary plate has a rectangular outline which is elongate horizontally. However this disposition is not limiting.

The auxiliary plate 120 is extended by a connection track 122. The connection track 122 is narrow. It extends up the entire height of the first electrode 100 parallel to the main plate 110 in order to provide a connection with the measurement means via the top of the electrode.

Nevertheless, it may be observed that the value of the reference capacitance varies as a function of the level of the liquid in the tank because of the presence of the connection track 122.

The secondary plate 130 is provided to overcome this difficulty. It has the same shape, the same area, and the same disposition as the connection track 120. As a result, the secondary plate 130 and the main plate 210 define a capacitance which is identical to that defined by the connection track 122 and the main plate 210, regardless of the level of liquid in the tank.

Thus, by subtracting the capacitance as determined by plate components 130 and 210 from the capacitance determined by plate components 120, 122, and 210, a reference capacitance is obtained which is independent of the level of liquid in the tank.

This reference capacitance makes it possible to determine the permittivity of the liquid. The reference capacitance is equal to ES/d, where E is the permittivity of the liquid, S is the area of the auxiliary plate 120, and d is the distance between the auxiliary plate 120 and the main plate 210.

Finally, FIG. 2 shows the guard ring 140. The guard surrounds the main plate 110 completely, and it also completely surrounds the secondary plate 130 and the auxiliary plate 120 together with its associated connection track 122.

The guard ring 140 eliminates any so-called "edge" effects with respect to the measurement capacitor constituted by the main plate 110 in association with the plate 210, with respect to the reference capacitor constituted by the auxiliary plate 120 and its connection track 122 in association with the main plate 210, and with respect to the compensation capacitor constituted by the secondary plate 130 in association with the main plate 210.

The above-mentioned spacers 300 are designed to allow the liquid being measured to penetrate into the gap d lying between the central electrode 100 and each of the two outer electrodes 200. The Applicant has determined that the width of the gap d between the outer electrodes 200 and the central electrodes 100 should lie in the range 0.8 mm to 1.2 mm. If the gap d is wider than 1.2 mm, then the capacitive probe loses its sensitivity (given that its capacitance is inversely proportional to the distance between the plates).

In contrast, if the gap d is less than 0.8 mm, then the probe suffers from large errors due to the effects of capillarity and of droplets of liquid being retained between the electrodes.

The effect of capillarity remains with a gap d lying in the range 0.8 mm to 1.2 mm. However, in this range of gap widths, the effect of capillarity is easily controlled. It satisfies the equation $h = A/\rho g d$, in which:

h is the elevation due to surface tension;
A is the surface tension of the liquid;
d is the gap between the plates;
$\rho$ is the density of the liquid; and
g is the acceleration due to gravity.

This effect of capillarity is illustrated diagrammatically in accompanying FIG. 6.

FIG. 6 shows one face of the central electrode 100. The level of the liquid surface at a distance from the central electrode 100 is referenced 10. The level of the liquid adjacent to the electrode 100 is referenced 12. These two levels 10 and 12 are separated by the elevation h.

The effect of capillarity, h, is independent of liquid volume and varies little with temperature. Consequently, it can be compensated adequately by means for subtracting the elevation h from the uncorrected level given by the measurement.

For example, the surface tension A of the various fuels currently available on the market lies in the range 26.8 to 28.10 in units of $10^{-3}$N/m.

For gasolines, density $\rho$ is 700 kg/m$^3$ to 750 kg/m$^3$, while for diesel oils $\rho$ is 850 kg/m$^3$.

This gives:

for gasolines an elevation h lying in the range 4.6 mm to 5 mm; and for diesel oils and elevation h lying in the range 3.9 mm to 4.2 mm.

It may be observed that for water the elevation is 9.3 mm.

As mentioned above, the effect of capillarity can thus be compensated merely by taking a single value of elevation, h, into account for all measurements of level.

It is also essential to ensure that the spacers 300 and the fixing rivets 350 lie outside the capacitive plate zone.

As shown in FIGS. 2 and 3, the spacers 300 and the fixing rivets 350 are thus provided on lugs 150 and 250 projecting out from the side edges of the central electrode 100 and of the outer electrodes 200, respectively.

As shown in FIG. 6, although the level 12 of the liquid lies parallel to the real level 10 of the liquid between the plane electrodes and lies at a constant distance h therefrom, when the level coincides with the spacers 300 the effect of capillarity gives rise to errors that are not consistent and cannot be controlled, as shown diagrammatically in FIG. 7.

Spacers 300 defining the distance between the plates are preferably made either of alumina, or of steatite, or else of a polymer having liquid crystals, such as the materials sold under the trademark VECTRA.

All three of the above-mentioned materials for making the spacers 300 have very good dimensional stability in various different fuels, and over a range of temperatures.

In accordance with another advantageous characteristic of the invention, the two faces of the central electrode 100 and the facing metal-coated face of respective ones of the outer electrodes 200 (assuming the outer electrodes are not laminated) are covered with a coating which is inert with respect to fuels. This coating must be of constant thickness since it contributes to the permittivity in the capacitors formed in this way, it must not be porous, and it must withstand various fuels without degradation, regardless of whether they are oxygenic or not.

The present invention provides for several different materials that are suitable for constituting such a coating.

In a first variant, the protective coating is constituted by a silkscreen deposit of a cationic varnish. It may be constituted, for example, by a varnish sold by the firm Holden Europe under the name CEI 9346. This varnish is preferably deposited to have a thickness of about 25$\mu$.

In a second variant, the protective coating is constituted by a silkscreen deposit of a polyimide or an epoxy varnish.

In a third variant in accordance with the present invention, the coating is constituted by a vacuum deposit of a parylene C type poly-p-xylene/polymer. The coating may be a few $\mu$ thick.

According to yet another variant embodiment, the protective coating may be formed by a deposit of a layer of hot pressed epoxy-impregnated glass fiber cloth.

Naturally, the electrical connections required at the tops of the electrodes between the plates and the electronic measuring means must be provided through the above-mentioned protective coatings.

The guard ring 140 is placed at the same potential as the main plate 110 by means of a potential copying stage 410 (see FIG. 8). For the purpose of effectively eliminating errors due to edge effects both while determining permittivity and while performing measurements, the guard ring is preferably of width 1 (see FIG. 2) which is not less than twice the gap width d between the plates. The guard ring 140 must also be placed as close as possible to the plates it guards. In accordance with the invention, the distance between the guard ring 140 and the plates it guards is about 0.4 mm.

As shown in FIG. 2, the main plate 110 is constituted by a rectangular plate extending over substantially the entire height of the tank and having parallel vertical free edges 111 and 112.

Where applicable, the main plate 110 may have edges 111 and 112 which are not rectilinear and not parallel, being shaped as a function of a calibration curve for the tank.

In the embodiment described above with reference to FIGS. 2 and 3, the possible error in determining the permittivity of the liquid due to the reference capacitance varying as a function of liquid level is eliminated by means of a differential capacitance having the same value and delimited by the second plate 130 and the main plate 210.

Figure 5:
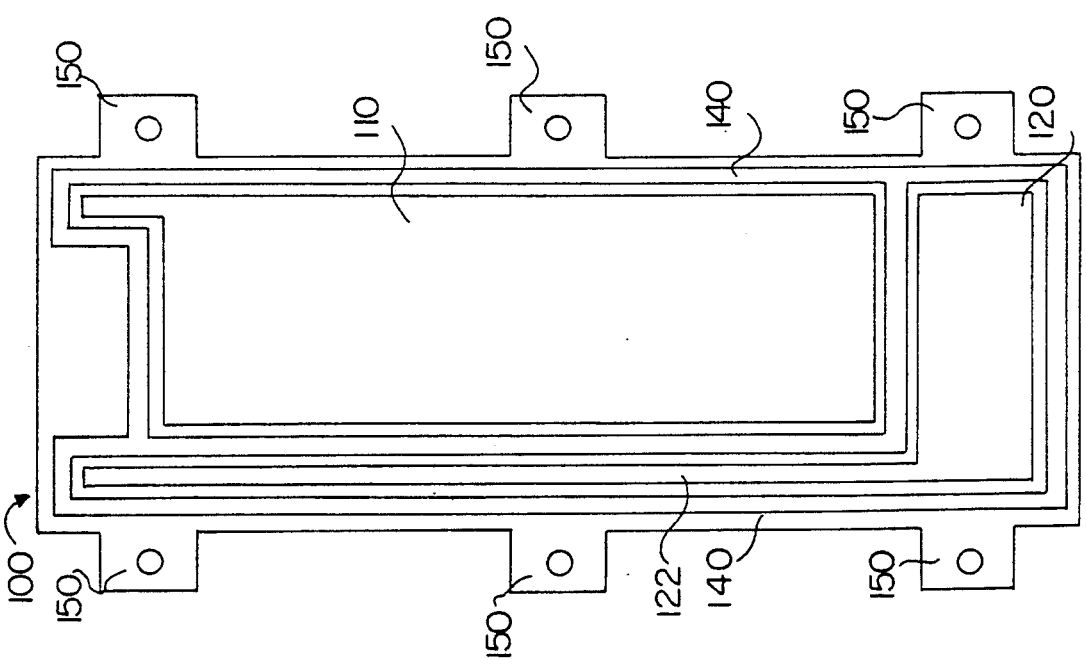

The error due to the connection track 122 can also be eliminated by omitting the second plate 210 where it faces said connection track, as shown in FIG. 5, where there is a window or cut-out 212 in the plate 210. Naturally, and as shown in FIG. 4, there is no need in this case to provide a secondary plate 130 on the central electrode 100. The shape of the guard ring 140 is also simplified.

In the accompanying figures, the shape of the plate is shown diagrammatically so as to show up clearly the guard ring 140, the connection track 122, and the secondary compensation plate 130. In practice, the plates 122, 130, and 140 are considerably narrower relative to the width of the detection plate 110.

Numerous variants on the embodiments described above are possible.

For example, plates 110, 120, 130, and 140 may be placed on each of the outer electrodes 200 and a main plate 210 may be placed on each of the faces of the central electrode 100.

It would also be possible to use an electrode 100 having a single active face only, in association with a single facing outer electrode 200.

In this case, it is greatly to be preferred for the measurement plate 110 surrounded by its guard ring 140 to be placed on a first face of a support of electrically insulating material and for the entire second face of said support to be covered with a plate connected to the guard ring.

The structure is now described of the measurement means 400 shown in accompanying FIG. 8 for the purpose of connection to the various plates mentioned above.

In essence, the measurement means 400 comprise a multiplexer member 420, a stage 410 for performing the above-mentioned potential copying, an oscillator 320, and a microprocessor central unit 440.

The means 400 make use of the fact that the various above-mentioned capacitors constituting the capacitive probe share a common plate constituted by the second main plate 210.

The multiplexer 420 connects the plates 110, 120, and 130 successively to the oscillator 430, such that the oscillator generates a frequency which is a function of the capacitance of the selected capacitor.

The switching of the multiplexer member 420 is controlled by the central unit 440 via links 441, 442, and 443.

The potential copying stage 410 is constituted by an operational amplifier. The amplifier has its non-inverting input connected to the output 422 of the multiplexer member. The inverting input of the operational amplifier 410 is looped to its output. The output of the operational amplifier 410 is also connected to the guard ring 140.

The oscillator 430 is constituted by a circuit comprising an operational amplifier 431 and resistors 432 to 436.

The output from the oscillator 400 is connected to an input 444 of the central unit 440.

Thus, the input 444 of the central unit 440 receives a frequency which is directly related to the capacitance delimited either by the plates 110 and 210, or by the plates 120 & 122 and 210, or else by the plates 130 and 210.

The system preferably has a cyclic calibration stage for the oscillator 430, comprising two steps during which the multiplexer 420 connects the oscillator 430 to capacitors having a known difference in capacitance instead of connecting to one of the plates on the electrodes 100 and 200.

For example, during a first step, a zero capacitance (represented diagrammatically by input 424 in FIG. 8) is used and during a second step an accurate known capacitance C426 is used.

Since the frequency available at the output of the oscillator 430 is of the form $F = aC + b$, and given the capacitance C426, it is possible to use the above-mentioned two calibration steps to calibrate the oscillator 430 by determining the constants a and b.

This calibration makes it possible subsequently to define accurately the capacitance provided by each of the capacitors 110-210, 120 & 122-210, and 130-210.

This process is represented diagrammatically by FIG. 9.

In this figure, measurement cycles are split up into five steps respectively referenced T1 through T5.

At each step T1, no capacitor is connected to the oscillator 430. At each step T2, the capacitance C426 is connected to the oscillator 430 by the multiplexer 420. Steps, T1 and T2 are used for calibrating the oscillator 430.

At each step T3, the multiplexer 420 connects the plate 130 to the input of the oscillator 430. Step T3 consequently serves to measure the capacitance defined by the secondary plate 130 and the main plate 210. It is recalled that this capacitance is equal to the capacitance defined by the connection track 122 and the main plate 210, regardless of the level of the liquid.

During each step T4, the multiplexer 420 connects the connection track 122 to the oscillator 430. During each step T4, the output from the oscillator 430 provides a frequency which is a function of the capacitance defined by the auxiliary plate 120 plus the connection track 122 in association with the main plate 210.

By subtracting the capacitance obtained during step T3 from the capacitance obtained during step T4, the reference capacitance is obtained directly, and given the area of the secondary plate 120 and the width of the gap d between the plates, this makes it possible to determine the permittivity of the liquid.

During each step T5, the multiplexer 420 connects the main plate 110 to the oscillator 430. Given the permittivity of the liquid, the resulting measurement can be used to determine the level of the liquid in the tank.

Insofar as the depth of fuel between the electrodes 110 and 210 follows the level of fuel in the tank, then the measured capacitance Cmes between the electrodes 110 and 210 depends on the level of fuel in the tank.

More precisely, the capacitance measured across the terminals of plates 110 and 210 corresponds to an electrical circuit having two capacitances in parallel: a first capacitance C1 corresponding to the immersed portion of the plates and a function of the permittivity of the fuel, and a second capacitance C2 corresponding to the portion of the plates situated above the fuel as a function of the permittivity of air.

Thus, Cmes = C1 + C2.

Regardless of the shape of the measurement electrode 110, the distribution of the areas in the liquid and above the liquid satisfy the equation: total area = liquid area + air area.

Since the distance between the plates 110 and 210 is constant and identical for C1 and C2:

K = liquid area of the first plate 110 divided by total area of the first plate 110 = (Cmes − Cair)/(Cimm − Cair) where Cmes equals the capacitance as measured between the first and second plates 110 and 210;

Cair = the capacitance of the first and second plates 110 and 210 when they are both in air; and Cimm = capacitance of the first and second plates 110 and 210 when fully immersed in liquid.

Thus:

K = liquid level/maximum liquid level;
K = 0 for an empty tank; and
K = 1 for a full tank.

Cair may be defined by calculation during design of the system given the areas of the electrodes. Cair is then stored in a memory associated with the central unit 440.

Alternatively, Cair may be defined by storing the value of the capacitance measured between the plates 110 and 210 before any fuel is put into the tank. Alternatively, Cair may be defined by a discrete capacitor, such as capacitor which is referenced C470 on FIGS. 8 and 12.

Cimm is defined by the calculation by the central unit 440 given the areas of the plates 110 and 210 and the permittivity of the fuel as measured using the plates 120 and 210.

Thus, given Cmes, Cair, and Cimm, the central unit 440 is in a position to determine the coefficient K which is representative of the level of fuel in the tank.

Where so desired, a measurement system in accordance with the present invention may use a plurality of capacitive probes disposed differently within the tank in order, for example, to take account of different orientations of the tank.

Under such circumstances, there is no need for the additional capacitive probes used to have their own reference plates. It suffices merely to connect the main plates similar to the plate 110 to appropriate inputs of the multiplexer unit 420. This disposition is shown diagrammatically in FIG. 8 in the form of multiplexer unit inputs referenced 110bis and 110ter.

The guard rings of the various probes may be connected in common.

It should also be observed that the second main plates 210 are all connected to circuit ground.

When auxiliary capacitive probes are used (e.g. 110bis, 110ter), the measurement cycle needs to be increased by as many multiplexing steps as there are auxiliary probes, these steps being represented by T6 and T7 in FIG. 10, for plates 110bis and 110ter.

The measurement means 400 are advantageously adapted to detect water should any accumulate in the bottom of the tank. To do this, the central unit 440 permanently compares the permittivity $\epsilon$ of the liquid obtained using the reference plate 120 with a predetermined threshold permittivity.

The permittivity of fuels is very different from the permittivity of water.

For example, the permittivity of the various different fuels currently available on the market lies in the range 2 to 4.5, whereas the permittivity of water is greater than 80.

The central unit 440 is preferably associated with storage means 450 suitable for containing a mean permittivity value, $\epsilon$ mean, which is used in the event of water being detected in the bottom of the tank, i.e. when the permittivity measured by the auxiliary plate 120 is no longer representative.

Figure 11:
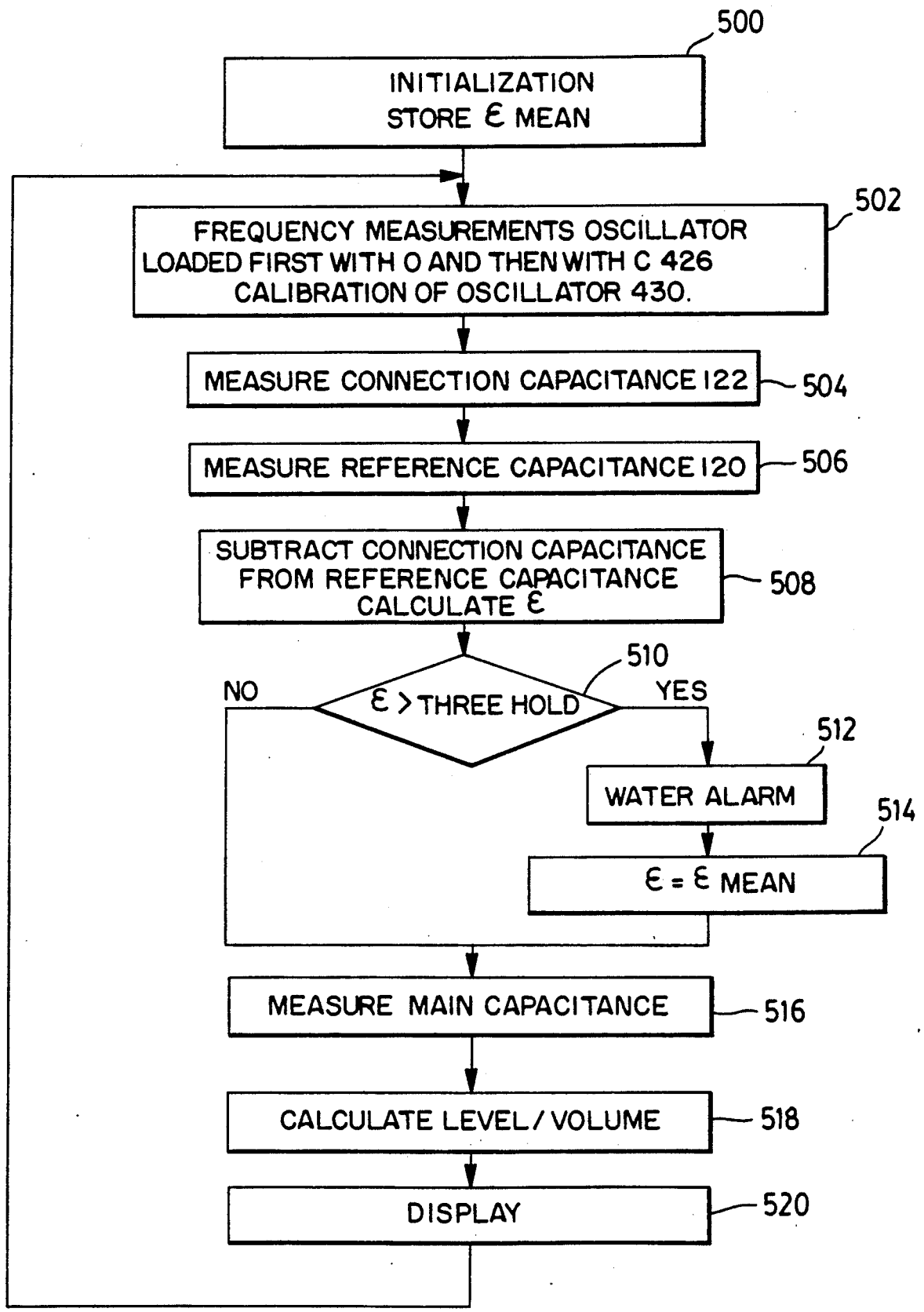
FIG. 11 is a flow chart illustrating the measurement method of the present invention.

The full measurement process in accordance with the present invention is shown diagrammatically in accompanying FIG. 11.

As shown in this figure, there is an initial step 500 during which the mean permittivity value $\epsilon$ mean is stored in the means 450.

At step 502, which corresponds to steps T1 and T2 in FIGS. 9 and 10, the multiplexer unit 420 connects its input 424 and the capacitor C426 in succession to the oscillator 430 for the purpose of calibrating the oscillator.

At step 504, the multiplexer member 420 connects the secondary plate 130 to the oscillator 430. The central unit 440 can thus determine a capacitance equal to that of the connection track 122.

At step 506, the multiplexer unit 420 connects the connection track 122 to the oscillator 430. The central unit 440 thus determines a capacitance equal to the sum of that defined by the auxiliary reference plate 120 and the connection track 122.

At step 508, the central unit 440 subtracts the capacitance obtained at step 405 from that obtained at step 406. The results can be used for determining the permittivity of the liquid, given the area of the plate 120 and the distance between said plate and the main plate 210.

At step 510, the central unit 440 tests whether or not the permittivity $\epsilon$ obtained at the step 508 is greater than a given threshold.

If it is greater, then the central unit 440 considers that water is present in the bottom of the tank and generates an alarm at step 512. In addition, in the following step 514, the central unit 440 imposes the value stored in the means 450 as the permittivity value equal to $\epsilon$ mean.

Step 514 is followed by step 516. Similarly, step 516 is normally reached when the test at step 510 gives a negative answer.

During step 516 the multiplexer member 420 connects the main plate 110 to the oscillator 430.

The central unit 440 can thus determine the measurement capacitance as defined between the main plates 110 and 210.

This value is used in step 518, given the permittivity of the liquid, for determining the level in the tank.

At following step 520, the central unit 440 displays the level and/or the volume of the liquid contained in the tank.

As shown in FIG. 8, the alarm signal (from step 512) is delivered to output 452 of the central unit (with output 452 being connected to an indicator lamp), whereas the level and/or volume information is delivered on an output 454 of the unit.

The output 454 may control a ratio-meter type instrument 472.

In general, ratio-meters comprise a plurality of crossed coils, and preferably two coils crossed at 90°, a shaft guided in rotation, a magnet fixed to the shaft and placed inside the coils, and a pointer outside the coils and fixed to the shaft.

The control signal applied to the coils of the ratio-meter preferably has a mark-space ratio which varies as a function of the level K of the fuel.

Figure 13:
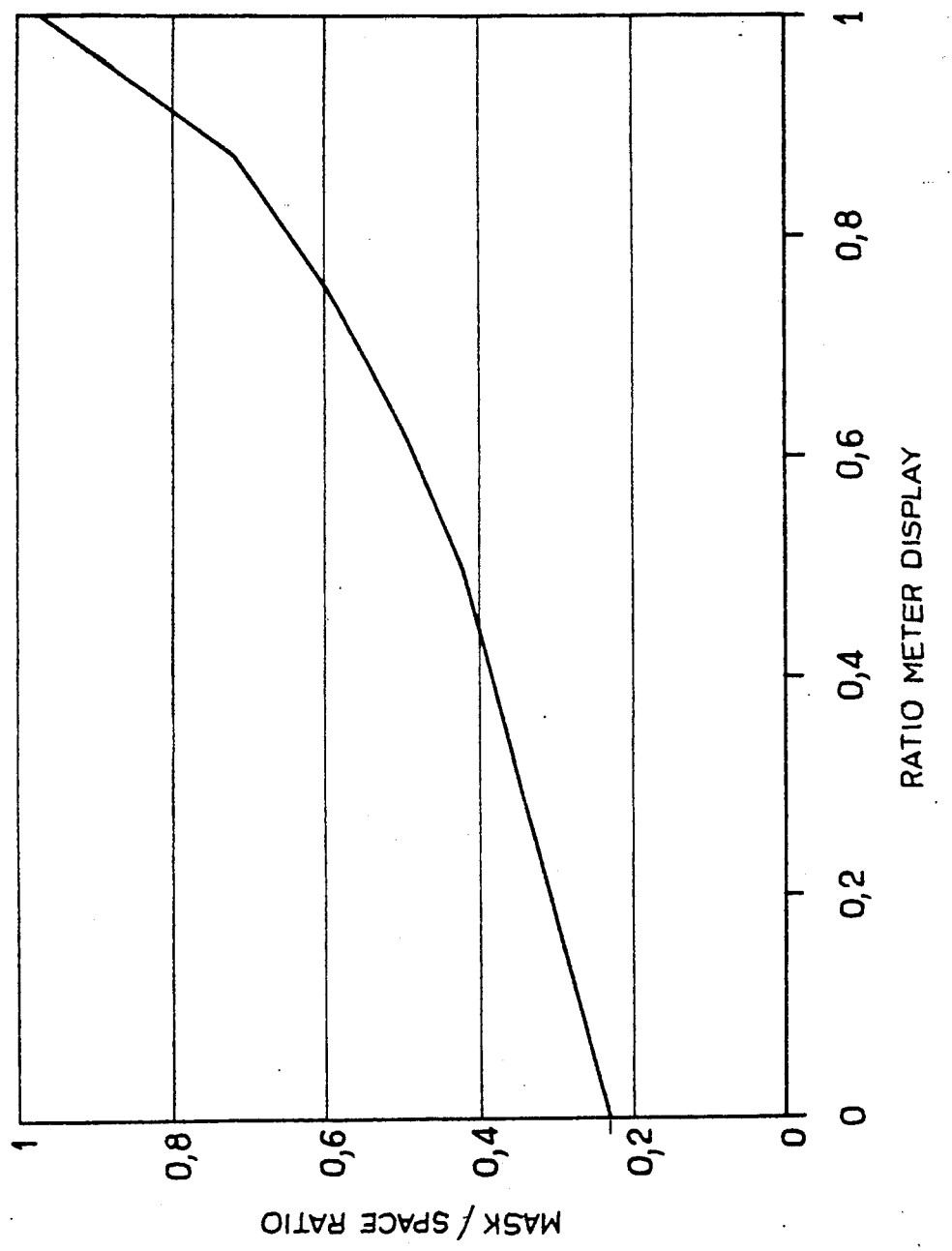
FIG. 13 is a graph showing the mark-space ratio of a signal for controlling deflection of the pointer of a ratiometer.

However, as shown in accompanying FIG. 13, the transfer curve between mark-space ratio and pointer deflection in ratiometers is not generally linear.

This non-linearity may be corrected by the central unit 440 in the way it defines the mark-space ratio it delivers.

It may also be corrected by the shape of the measurement electrode 110 during the design stage.

In a variant, when water is detected at test step 510, the central unit does not use the pre-stored value for $\epsilon$ mean, but instead uses the last acceptable stored value for the permittivity, as constantly updated in the means 450.

In order to obtain accurate level information, it is necessary for the stray capacitance on the various inputs to the multiplexer 420 to be the same. This is not always possible. Under such circumstances, it is possible, for each system, to measure the differences between the input capacitances of the multiplexer prior to connecting the capacitive probe thereto and to store the measured input stray capacitances in a non-volatile memory so that the central unit 440 can take account of these stray capacitances when determining the level of the fuel.

Further, the means constituting multiplexer 440 inevitably suffer from stray capacitance and some of this capacitance varies as a function of the level of the fuel. In order to prevent such non-constant stray capacitances disturbing measurement, it is preferable, in accordance with the invention, to provide transistors such as MOS transistors that shunt the non-selected inputs to the multiplexer 440.

Figure 12:
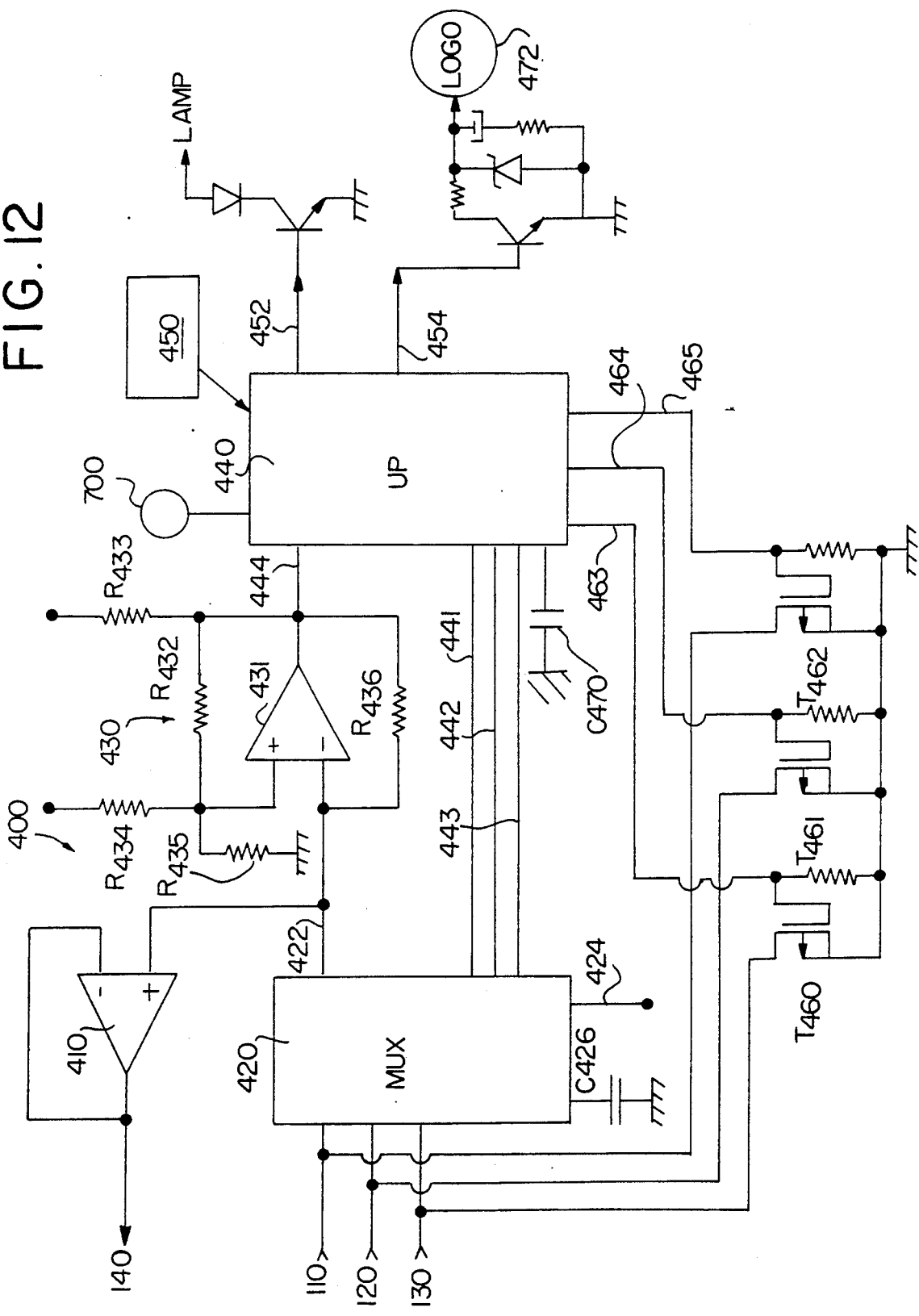
FIG. 12 shows a variant of capacitance-measuring means in accordance with the present invention.

These transistors are shown in accompanying FIG. 12 under references T460, T461, and T462.

The main conducting paths of the transistor T460, T461, and T462 are connected between ground and respective ones of the multiplexer inputs associated with the electrodes 110, 120, and 130.

The control electrodes of the transistors T460, T461, and T462 are controlled by the central unit 440 via links 463, 464, and 465.

Where appropriate, the central unit 440 may also be designed to apply smoothing to the information obtained.

Figure 14:
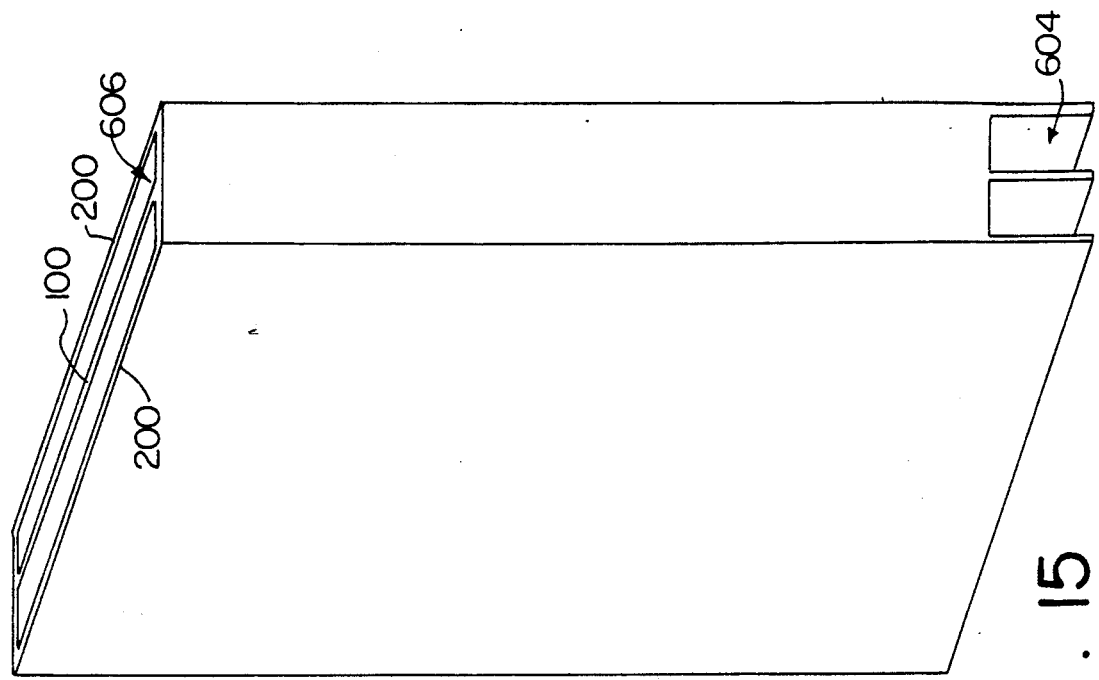
FIG. 14 shows a variant of the capacitive probe according to the invention in a vertical steadying tube.

In conventional manner as shown in FIG. 14, the capacitive probe S is advantageously disposed in a vertical steadying tube 600 for providing protection against waves and connected to the tank via a calibrated bore 602.

Where appropriate, the wall of the antiwave tube may be constituted by the outer electrodes 200 themselves.

Figure 15:
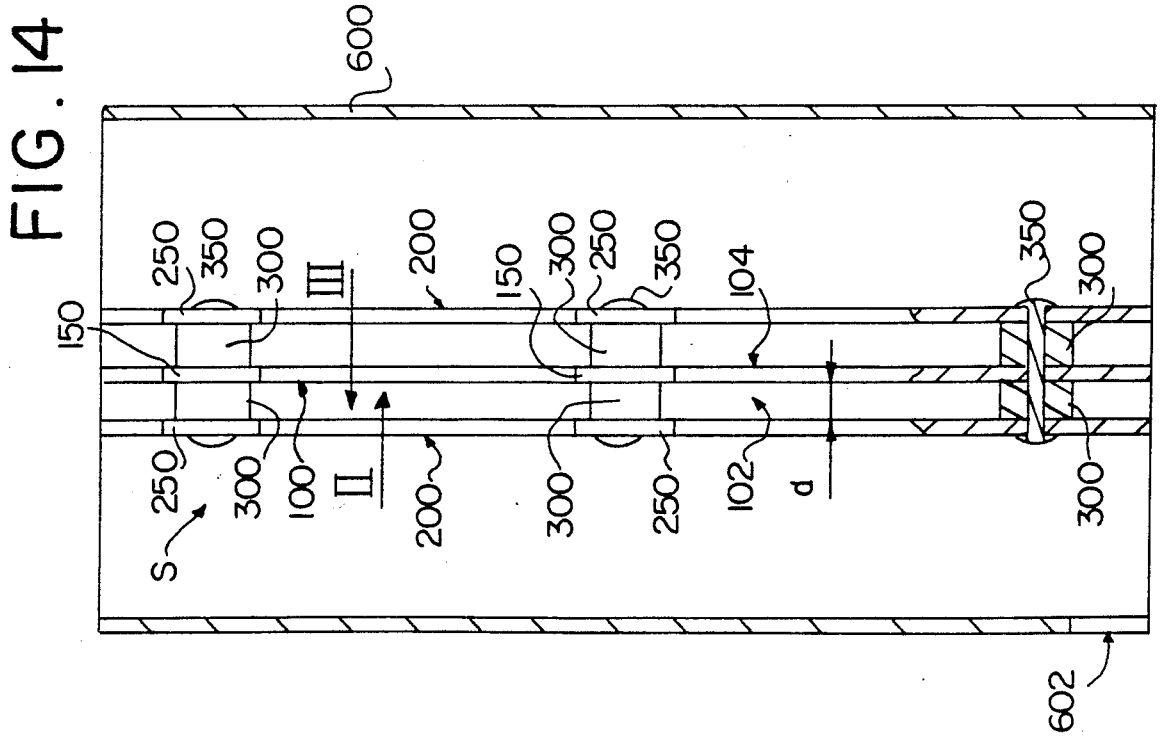
FIG. 15 shows another variant of the capacitive probe according to the invention wherein the steadying tube is formed by the electrodes of the probe itself.

In this case as shown in FIG. 15, the electrodes are shaped in such a manner that the volume of fuel they surround communicates with the tank only via one or more small-sized orifices 604, 606, and preferably via a bottom orifice and a top orifice. This provides a hydraulic time constant which slows down changes in liquid level inside the measurement chamber delimited by the electrodes, in comparison with liquid motion in the tank.

It is preferable to constitute the antiwave tube using the electrodes themselves, since placing the capacitive probe in a steadying tube is a solution that occupies more space.

Where applicable, water may be detected in the bottom of the tank by measuring the resistance between the plates 120 and 210 instead of measuring the permittivity of the liquid.

Naturally, the present invention is not limited to the particular embodiments described above, but it extends to any variant coming within its scope.

According to another advantageous characteristic of the present invention, the central unit 440 may be adapted to enable the nature of the fuel contained in the tank to be determined on the basis of the permittivity measured by the capacitance defined by the auxiliary plate 120 and the main plate 210.

To do this, the central unit 440 may compare the measured value of permittivity with a plurality of predetermined stored values.

However, it is known that the permittivity of fuels varies as a function of temperature.

In order to obtain reliable information, it is therefore preferable to measure the temperature of the fuel as well and to correct the measured fuel permittivity as a function of the measured temperature. The temperature of the fuel may be measured, for example, by means of a thermistor 700 (see FIGS. 8 and 12).

According to another advantageous characteristic of the present invention, the measurement apparatus is also designed to provide a signal when the level of fuel present in the tank falls into a "reserve" range.

This signal may be obtained by comparing the above-mentioned parameter K with a threshold value.

The signal concerning the fuel level falling into a "reserve" range may also be derived from special electrodes spaced close to the bottom of the tank, e.g. electrodes placed above the auxiliary electrode 120.

We claim:

1. Apparatus for measuring the level of a liquid contained in a tank, the apparatus comprising a capacitive probe including at least two separate, generally vertical, parallel main plates for immersion in the liquid, means for supporting the plates in the tank, spacer means placed between the plates so as to keep the plates at a constant distance from each other, capacitance-measuring means having a detection input and a ground, the detection input being connected to a first one of the main plates and the ground being connected to a second one of the main plates, guard ring surrounding the first plate, a potential copying stage having its input connected to the first plate and its output connected to the guard ring, and a central unit connected to said capacitance-measuring means so as to determine the level of the liquid by calculating a coefficient K such that:

$K = (Cmes - Cair)/(Cimm - Cair)$, where:

Cmes = the measuring capacitance between the first and second plates,

Cair = the capacitance of the first plate and the second plate in air,

Cimm = the capacitance of the first plate and the second plate when they are totally immersed; and whereby K is defined as the area of the first plate in the liquid divided by the total area of the first plate.

2. Apparatus according to claim 1, including auxiliary plate elements having a known area which defines a reference capacitance in the bottom of the capacitive probe, and including calculating means to determine the permittivity of the fluid, said calculating means making the following quotient $E = Cd/S$ wherein C is the capacity of the reference capacitance, E is the permittivity of the liquid, S is the area of the auxiliary plate elements and d is the distance between the auxiliary plate elements.

3. Apparatus according to claim 2, wherein one of the auxiliary plate elements coincides with one of the main plates.

4. Apparatus according to claim 2, wherein one of the auxiliary plate elements is integral with the second main plate.

5. Apparatus according to claim 3, wherein the other auxiliary plate element is connected to a connection track which extends to the top portion of the probe.

6. Apparatus according to claim 5, including secondary plate elements defining the capacitance having the same shape and the same relative position as the capacitance delimited by the connection track and the second main plate.

7. Apparatus according to claim 6, wherein one of the secondary plate elements coincides with the second main plate.

8. Apparatus according to claim 6, including means designed to subtract the capacitance determined by the secondary plate elements from the value of the capacitance determined by the auxiliary plate elements and the association connection track.

9. Apparatus according to claim 1, comprising at least one support of electrically insulating material carrying the first main plate, an auxiliary plate placed at the bottom of the support beneath the main plate, a connection track connected to the auxiliary plate and extending to the top portion, a secondary plate element having the same shape as the connection track and extending parallel thereto, and the guard ring which surrounds the main plate, which surrounds the auxiliary plate and its association connection track, and which surrounds the secondary plate element, the second plate being supported parallel to the support by spacers made of electrically insulating material, the second plate extending over the main plate, the auxiliary plate together with its connection track, and the secondary plate.

10. Apparatus according to claim 1, wherein the capacitive probe includes at least one support of electrically insulating material which carries the first main plate, an auxiliary plate placed at the bottom of the support beneath the main plate, a connection track connected to the auxiliary plate and extending to the top portion of the support, and the guard ring which surrounds the main plate, and which surrounds the auxiliary plate together with its associated connection track, the second plate being supported parallel to the support by spacers of electrically insulating material, and being shaped to extend over the main plate and the auxiliary plate but not to extend over the connection track.

11. Apparatus according to claim 1, wherein the capacitive probe comprises a central support of electrically insulating material coated on each of its two faces with capacitor plates, together with two outer electrode elements placed facing respective faces of the support and separated therefrom by said spacer means made of electrically insulating material.

12. Apparatus according to claim 11, wherein each of the two faces of the central support carries at least one main plate and an auxiliary plate defining a reference capacitance which is connected to a connection track extending to the top portion of the probe.

13. Apparatus according to claim 11, wherein a capacitor plate provided on a first face of the central support is electrically interconnected to another capacitor plate provided on the second face of the central support and the two outer electrode elements are electrically interconnected.

14. Apparatus according to claim 1, wherein at least some of the plates are carried by a support made of an electrically insulating material selected from the group comprising: polyimides and glass fiber cloth impregnated with epoxy resin.

15. Apparatus according to claim 1, wherein the plates are made of copper by the subtractive method.

16. Apparatus according to claim 1, wherein the two main plates present a space which lies in the range 0.8 mm to 1.2 mm.

17. Apparatus according to claim 1, including means designed to correct an information representative of the liquid level by a value related to the capillarity effect and defined by the equation:

$h = A/d\rho g$, in which:
A is the surface tension of the liquid,
d is the width of the gap between the plates,
$\rho$ is the density of the liquid, and
g is acceleration due to gravity.

18. Apparatus according to claim 1, wherein said spacer means are made of electrically insulating material and are placed outside the active zones of the plates.

19. Apparatus according to claim 1, wherein the second plate is made of tin plate or stainless steel.

20. Apparatus according to claim 1, wherein the said spacer means are made of a material selected from the group comprising: alumina; steatite; and liquid crystal polymers.

21. Apparatus according to claim 1, wherein at least some of the plates are protected by a layer of electrically insulating material.

22. Apparatus according to claim 21, wherein the electrically insulating material is selected from the group comprising: cationic varnish, polyimide varnish, epoxy varnish, a poly-p-xylene/polymer, glass fiber filled epoxy resin.

23. Apparatus according to claim 1, wherein the main plates have a shape which reproduces a calibration curve for the tank.

24. Apparatus according to claim 1, wherein the guard ring has a width which is equal to 2d, where d is the width of a gap between the plates.

25. Apparatus according to claim 1, wherein the guard ring and the plates present a distance which is less than 1 mm and is preferably about 0.4 mm.

26. Apparatus according to claim 1, including means designed to compare a measured permittivity of the liquid with a threshold, and to generate an alarm if the measured permittivity exceeds the threshold.

27. Apparatus according to claim 1, including means suitable for storing a mean permittivity value and for using said mean permittivity value if a measured permittivity exceeds a threshold.

28. Apparatus according to claim 1, including means designed to compare a measured permittivity of the liquid with a threshold, and means designed to store the most recent value obtained for the measured permittivity so long as the value does not exceed the threshold.

29. Apparatus according to claim 1, wherein the means for measuring capacitance include an oscillator loaded by the capacitive probe, and means responsive to the frequency of the oscillator.

30. Apparatus according to claim 29, including a multiplexer member designed to connect various plates successively to the oscillator.

31. Apparatus according to claim 29, including means designed to connect the oscillator during an initial calibration stage successively to capacitors having a known capacitance difference.

32. Apparatus according to claim 1, wherein:
the bottom portion of the capacitive probe includes auxiliary plate elements defining a reference capacitance suitable for determining the permittivity of the liquid; and
means are provided which are designed to compare the measured permittivity of the liquid with a threshold, to generate an alarm if the measured permittivity exceeds the threshold, and to measure the level and/or the volume of the fluid on the basis of a predetermined value for the permittivity if the measured permittivity exceeds the threshold.

33. Apparatus according to claim 1, wherein the main plates are plane and parallel.

34. Apparatus according to claim 1, wherein the first plate surrounded by the guard ring is placed on a first face of a plane support made of electrically insulating material, and the second face of the support is covered by an electrode which is connected to the guard ring.

35. Apparatus according to claim 1, wherein Cair is defined by calculation during design of the system, given the areas of the plates, and is stored in a memory.

36. Apparatus according to claim 1, wherein Cair is defined by storing the capacitance measured between the first and second plates prior to liquid being placed in the tank.

37. Apparatus according to claim 1, wherein Cair is defined by a discrete capacitor.

38. Apparatus according to claim 30, wherein transistors are provided for selectively shunting non-selected inputs of the multiplexing member.

39. Apparatus according to claim 1, wherein a signal representative of level is delivered by a ratio-meter type instrument receiving a control signal having a variable mark-space ratio.

40. Apparatus according to claim 39, wherein the first plate has a shape which corrects for non-linearities in the transfer curve between mark-space ratio and deflection of the ratio-meter pointer.

41. Apparatus according to claim 1, wherein the capacitive probe is associated with an antiwave steadying tube connected to the tank by at least one calibrated bore.

42. Apparatus according to claim 41, wherein the steadying tube is formed by the electrodes of the probe itself.

43. Apparatus according to claim 2, including a central unit designed to determine the nature of the liquid by comparing a measured value of the permittivity of the liquid with predetermined values stored in the central unit.

44. Apparatus according to claim 43, further including means for measuring the temperature of the liquid and for correcting the measured permittivity value as a function of the measured temperature.

* * * * *